United States Patent
Xu et al.

(10) Patent No.: US 10,064,192 B2
(45) Date of Patent: Aug. 28, 2018

(54) D2D RESOURCE ALLOCATION METHOD, AND DATA TRANSMISSION METHOD AND DEVICE

(71) Applicant: China Academy of Telecommunications Technology, Beijing (CN)

(72) Inventors: Fangli Xu, Beijing (CN); Erlin Zeng, Beijing (CN); Yali Zhao, Beijing (CN); Jing Fu, Beijing (CN)

(73) Assignee: China Academy of Telecommunications Technology, Beijing (CN)

( * ) Notice: Subject to any disclaimer, the term of this patent is extended or adjusted under 35 U.S.C. 154(b) by 34 days.

(21) Appl. No.: 15/107,693

(22) PCT Filed: Dec. 24, 2014

(86) PCT No.: PCT/CN2014/094745
§ 371 (c)(1),
(2) Date: Jun. 23, 2016

(87) PCT Pub. No.: WO2015/096719
PCT Pub. Date: Jul. 2, 2015

(65) Prior Publication Data
US 2016/0323869 A1 Nov. 3, 2016

(30) Foreign Application Priority Data
Dec. 27, 2013 (CN) .......................... 2013 1 0741883

(51) Int. Cl.
*H04W 72/04* (2009.01)
*H04L 5/00* (2006.01)
(Continued)

(52) U.S. Cl.
CPC ......... *H04W 72/048* (2013.01); *H04L 5/0007* (2013.01); *H04W 72/02* (2013.01);
(Continued)

(58) Field of Classification Search
None
See application file for complete search history.

(56) References Cited

U.S. PATENT DOCUMENTS

| 7,492,737 B1 | 2/2009 | Fong et al. |
| 8,761,099 B2 * | 6/2014 | Charbit ................ H04W 72/04 370/329 |

(Continued)

FOREIGN PATENT DOCUMENTS

| CN | 102422703 A | 4/2012 |
| CN | 102547871 | 7/2012 |

(Continued)

OTHER PUBLICATIONS

International Search Report for PCT/CN2014/094745 dated Mar. 24, 2015.
(Continued)

*Primary Examiner* — Candal Elpenord
(74) *Attorney, Agent, or Firm* — Foley and Lardner LLP

(57) ABSTRACT

Disclosed are a D2D resource allocation method, and data transmission method and device, the D2D resource allocation method comprising: determining a D2D resource configuration corresponding to the quality of service (QoS) level of a D2D service; and transmitting to a user equipment (UE) the information of the D2D resource configuration corresponding to the service quality level of the D2D service. The D2D data transmission method comprises: according to the received information of the D2D resource configuration corresponding to the service quality level of the D2D service, selecting a transmission resource for the
(Continued)

D2D service to be transmitted; and transmitting the data of the D2D service over the selected transmission resource. The D2D service transmission requirement is considered in allocating and selecting D2D resources, thus further improving the system D2D resource allocation efficiency without affecting the D2D service transmission requirement.

16 Claims, 3 Drawing Sheets

(51) Int. Cl.
*H04W 72/02* (2009.01)
*H04W 72/08* (2009.01)

(52) U.S. Cl.
CPC ..... *H04W 72/0473* (2013.01); *H04W 72/085* (2013.01); *H04W 72/087* (2013.01)

(56) References Cited

U.S. PATENT DOCUMENTS

| | | | |
|---|---|---|---|
| 9,351,315 B2* | 5/2016 | Bao | H04W 72/1278 |
| 2010/0189046 A1* | 7/2010 | Baker | H04L 5/0007 |
| | | | 370/329 |
| 2012/0243431 A1* | 9/2012 | Chen | H04W 72/0406 |
| | | | 370/252 |
| 2012/0307764 A1* | 12/2012 | Zhao | H04W 28/24 |
| | | | 370/329 |
| 2013/0287012 A1 | 10/2013 | Pragada et al. | |
| 2014/0146762 A1* | 5/2014 | Kuo | H04W 4/21 |
| | | | 370/329 |
| 2015/0156806 A1* | 6/2015 | Pan | H04W 72/121 |
| | | | 455/39 |

FOREIGN PATENT DOCUMENTS

| | | |
|---|---|---|
| CN | 102858012 | 1/2013 |
| CN | 103181138 | 6/2013 |
| WO | WO 2012/159270 | 11/2012 |
| WO | WO-2012/160539 | 11/2012 |

OTHER PUBLICATIONS

Interdigital Communications: "Multiple Transmission Pools for Prose Communications", 3GPP Draft; R2-145204 Multiple Resource Pools for Communications, vol. RAN WG2, No. San Francisco, USA; Nov. 17, 2014-Nov. 21, 2014.

* cited by examiner

D2D RESOURCE ALLOCATION METHOD, AND DATA TRANSMISSION METHOD AND DEVICE

This application is a US National Stage of International Application No. PCT/CN2014/094745, filed on Dec. 24, 2014, designating the United States, and claiming the benefit of Chinese Patent Application No. 201310741883.7, filed with the Chinese Patent Office on Dec. 27, 2013 and entitled "Method for allocating a D2D resource, and method and apparatus for transmitting data", which is hereby incorporated by reference in its entirety.

FIELD

The present application relates to the field of wireless communications and particularly to a method for allocating a D2D resource, and a method and apparatus for transmitting data.

BACKGROUND

Communication is controlled centrally by a network In a Long Term Evolution (LTE) system, that is, both uplink and downlink data of a User Equipment (UE) are controlled by the network to be transmitted and received. In this mode, communication between one UE and another UE is forwarded and controlled by the network, and there is no direct communication link between the UE and the other UE, where data transmission between the UE and the network can be referred simply to as Device to Network (D2N) transmission.

In future development of a mobile communication system, in order to better satisfy a user demand, and to improve the efficiency of exchanging information between the devices, the mechanisms of Device to Device (D2D) discovery and Device to Device (D2D) communication have been introduced.

The D2D discovery mechanism is a direct discovery mechanism between two devices proximate to each other. Both of the D2D discovery devices may be online devices or may be offline devices, or one of the devices may be an online device, and the other device may be an offline device. The online device refers to a device located inside a coverage area of the network (e.g., a Third-Generation Partner Project (3GPP) network) and operating over a spectrum resource of the network is accessible. The offline device refers to a device located outside a coverage area of the network (e.g., a 3GPP network), or located inside the coverage area of the network but operating over a dedicated spectrum.

At present, air interface resources of D2D discovery are allocated in two modes, where one of the modes is the common resource pool mode in which the UEs are configured with the same air interface resources over which D2D discovery data are transmitted in some area, and the data transmitting UEs can transmit the data in some detection and avoidance mechanism, and the common resource pool is controlled by an evolved Node B (eNB) if the devices are online, or the common resource pool may be pre-configured, or may be controlled by a central control node, if the devices are offline; and the other mode is the dedicated resource mode in which a dedicated D2D transmission resource (i.e., an air interface resource) is allocated for each UE by pre-configuring the dedicated D2D transmission resource or by a central control node configuring the dedicated D2D transmission resource (which is controlled by the eNB if the UE is online).

Here the central control node is a UE or a network element capable of controlling resources, which can be referred to as a Central Node (CN) or a Central Element (CE).

D2D communication is allowed to be performed directly between devices proximate to each other. For the sake of a convenient description, a direct communication link between Device to Device (D2D) UEs can be referred to as a D2D link, and a cellular communication link between the network and the D2D UE can be referred to as a D2N link. FIG. 1 illustrates a schematic diagram of D2D communication.

Both of the D2D communication devices can be online or offline, or one of the devices can be online, and the other device can be offline.

There are the following three typical D2D communication scenarios:

In a first scenario, there is one-to-one communication between D2D UEs.

In a second scenario, one device transmits the same data once to all the devices in a communication group (group communication).

In a third scenario, one device transmits the same data once to all the proximate devices (broadcast communication).

Here one-to-one communication between D2D UEs is generally applicable to social and other applications, and the group and broadcast communication scenarios are generally applicable to fire fighting, rescuing, antiterrorism, and other public security applications.

At present there are generally two resource allocation modes for D2D communication, i.e., the common resource pool mode and the dedicated resource mode, which are particularly similar to the resource allocation modes for D2D discovery.

Different D2D transmission resource demands of different D2D services have not been taken into account in existing D2D resource allocation (including D2D discovery resource allocation and D2D communication resource allocation), and by the UE selecting a D2D service transmission resource.

SUMMARY

Embodiments of the application provide a method for allocating a D2D resource, and a method and apparatus for transmitting data so as to allocate and select a D2D resource satisfying a D2D service transmission demand.

An embodiment of the application provides a method for allocating a D2D resource, the method including:
  determining D2D resource configurations corresponding to quality of service levels of D2D services; and
  transmitting information about the D2D resource configurations corresponding to the quality of service levels of the D2D services to a user equipment.

In the method for allocating a D2D resource according to the embodiment of the application, a D2D resource is configured according to a Quality of Service (QoS) level of a D2D service, and information about the D2D resource configuration corresponding to the QoS level of the D2D service is transmitted to the UE. Stated otherwise, the D2D resource can be allocated for the UE by taking into account a transmission demand for the D2D service so that the QoS of D2D transmission can be guaranteed based upon the correspondence relationship between the QoS level and the D2D resource, so (particularly in the case of Carrier Sense Multiple Access (CSMA)) a transmission resource for transmitting a service with a high required QoS will not be preempted by the D2D service with a low required QoS so that the former service will not be blocked, and the efficiency of allocating a D2D resource of the system can be further improved without discouraging the transmission demand for the D2D service.

In the following respective embodiments of the application, a QoS level of a D2D service will be referred simply to as a QoS level.

The D2D resource allocation modes typically include the common resource pool mode and the dedicated resource mode. The method for allocating a D2D resource according to the embodiment of the application will be described below taking these two modes respectively as examples.

In the common resource pool mode, the D2D resource configurations corresponding to the QoS levels can be determined by determining D2D resource pool configurations corresponding to the respective QoS levels; and the information about the determined D2D resource configurations corresponding to the QoS levels can be transmitted to the UE by transmitting information about the D2D resource pool configurations corresponding to the respective QoS levels to the UE. Further to this, the information about the D2D resource pool configurations can include but will not be limited to at least one of:

information about time-frequency resources in the D2D resource pools;
information about resource configuration periodicities of the D2D resource pools;
information about offsets of the D2D resource pools;
information about modulation and coding scheme (MCS) levels for use in transmission of data over resources in the D2D resource pools;
information about the numbers of retransmissions in transmission of data over resources in the D2D resource pools;
information about power allocation in transmission of data over resources in the D2D resource pools; and
parameters related to a collision detection mechanism for use in selection among resources in D2D resource pools.

Here the resources in the resource pools corresponding to the different QoS levels may be different. Alternatively resources in a resource pool of a high QoS level include resources in a resource pool of a low QoS level, for example, the information about the time-frequency resources in the resource pool of the high QoS level include the information about the time-frequency resources in the resource pool of the low QoS level.

In order to ensure reasonable division of resources into the respective QoS levels, the D2D resource pool configurations corresponding to the respective QoS levels need to be maintained. They can be maintained by an access stratum node, e.g., an eNB, a UE, a network element, etc., which can function as a central control node, or a resource control node at another access stratum; or they can be maintained by a higher-layer node, e.g., a Proximity Service (ProSe) node. Preferably the D2D resource pool configurations corresponding to the respective QoS levels can be maintained by detecting the amounts of transmitted service data over the resources in the respective D2D resource pools, judging the reasonability about division of the resources into the different QoS levels, and adjusting the resources in the resource pools corresponding to the different QoS levels according to a result of judgment for the reasonability about division of the resources.

In the dedicated resource mode, the D2D resource configurations corresponding to the QoS levels can be determined by receiving a resource request of the UE carrying the information about the QoS levels, and determining the D2D resource configurations corresponding to the QoS levels indicated by the information about the QoS levels. The information about the determined D2D resource configuration corresponding to the QoS levels can be transmitted to the UE by transmitting the information about the determined D2D resource configurations, and D2D service indication information to the UE, where the D2D service indication information indicates the D2D services corresponding to the information about the determined D2D resource configuration; or the information about the determined D2D resource configurations corresponding to the QoS levels can be transmitted to the UE by transmitting the information about the determined D2D resource configurations, and QoS level indication information to the UE, where the QoS level indication information indicates the QoS levels corresponding to the information about the determined D2D resource configurations. Further to this, the information about the D2D resource configurations can include but will not be limited to at least one of:

information about time-frequency resources among D2D resources;
information about modulation and coding scheme levels for use in transmission of data over D2D resources;
information about the numbers of retransmissions in transmission of data over D2D resources; and
information about transmit power in transmission of data over D2D resources.

An embodiment of the application provides a method for transmitting D2D data, the method including:

selecting transmission resources for D2D services to be transmitted, according to received information about D2D resource configurations corresponding to QoS levels of the D2D service; and
transmitting data of the D2D services over the selected transmission resources.

In the method for transmitting D2D data according to the embodiment of the application, a D2D transmission resource is selected according to a QoS level of the D2D services. Stated otherwise, the D2D transmission resource can be selected by taking into account a transmission demand for a D2D service so that the QoS of D2D transmission can be guaranteed based upon the correspondence relationship between the QoS level and the D2D resource, no (particularly in the case of CSMA) a transmission resource for transmitting a service with a high required QoS will not be preempted by the D2D service with a low required QoS so that the former service will not be blocked, and the efficiency of allocating a D2D resource of the system can be further improved without discouraging the transmission demand for the D2D service.

The D2D resource allocation modes typically include the common resource pool mode and the dedicated resource mode. The method for transmitting D2D data according to the embodiment of the application will be described below taking these two modes respectively as examples.

In the common resource pool mode, the transmission resources can be selected for the D2D services to be transmitted, according to the received information about the D2D resource configurations corresponding to the QoS levels of the D2D services by determining D2D resource pools corresponding to the QoS levels of the D2D services to be transmitted; and selecting the transmission resources in the determined D2D resource pools, for the D2D services to be transmitted, according to received information about D2D resource pool configurations corresponding to the respective QoS levels of the D2D services.

In the dedicated resource mode, a resource request is further sent before the transmission resources are selected for the D2D services to be transmitted, where the resource requests canes the information about the QoS levels of the D2D services to be transmitted; and the transmission resources can be selected for the D2D services to be transmitted according to the received information about the D2D resource configurations corresponding to the QoS levels of the D2D services by selecting the transmission resources for the D2D services to be transmitted, according to the received information about the D2D resource configurations corresponding to the QoS levels of the D2D services to be transmitted, where the information about the D2D resource configurations corresponding to the QoS levels of the D2D services to be transmitted is transmitted by a resource request receiver in response to the resource request.

Further to any one of the embodiments above of the method for transmitting D2D data, if there are a number of D2D services to be transmitted, then transmission resources can be selected only for those D2D services to be transmitted at high QoS levels, and service data of only those D2D services can be transmitted, or transmission resources can be selected for the D2D services to be transmitted by guaranteeing transmit power of preferentially those services to be transmitted at high QoS levels; or transmission resources can be selected for the D2D services to be transmitted by selecting transmission resources preferentially for those services to be transmitted at high QoS levels.

Preferably if the number of D2D services allowed to be transmitted is less than the number of D2D services to be transmitted, then transmission resources can be selected only for those services to be transmitted at high QoS levels, and service data of only those D2D services can be transmitted.

Preferably if there is limited transmit power of at least two D2D services to be transmitted, then transmission resources can be selected for the D2D services to be transmitted, by guaranteeing the transmit power of preferentially those services to be transmitted at high QoS levels.

Preferably if available transmission resources can not satisfy a resource demand for at least two D2D services to be transmitted, then transmission resources can be selected for the D2D services to be transmitted, by selecting a transmission resource preferentially for a service to be transmitted at a high QoS level.

Further to any one of the embodiments above of the method for transmitting D2D data, preferably the transmission resources can be selected for the D2D services to be transmitted, according to the received information about the D2D resource configurations corresponding to the QoS levels of the D2D services as follows: if the transmission resources selected for the D2D services to be transmitted, according to the received information about the D2D resource configurations corresponding to the QoS levels of the D2D services to be transmitted can not satisfy transmission requirements of the D2D services to be transmitted, then the transmission resources can be selected for the D2D services to be transmitted, according to information about D2D resource configurations of low QoS levels which are lower than the QoS levels of the D2D services to be transmitted.

Based upon the same inventive idea as the method above, an embodiment of the application provides an apparatus for allocating a D2D resource, the apparatus including:

a D2D resource configuring module is configured to determine D2D resource configurations corresponding to QoS levels; and a D2D resource configuration information transmitting module is configured to transmit information about the determined D2D resource configurations corresponding to the QoS levels to a UE.

In the apparatus for allocating a D2D resource according to the embodiment of the application, a D2D resource is configured according to a QoS level of a D2D service, and information about the D2D resource configuration corresponding to the QoS level of the D2D service is transmitted to the UE. Stated otherwise, the D2D resource can be allocated for the UE by taking into account a transmission demand for the D2D service so that the QoS of D2D transmission can be guaranteed based upon the correspondence relationship between the QoS level and the D2D resource, so (particularly in the case of CSMA) a transmission resource for transmitting a service with a high required QoS will not be preempted by the D2D service with a low required QoS so that the former service will not be blocked, and the efficiency of allocating a D2D resource of the system can be further improved without discouraging the transmission demand for the D2D service.

In the common resource pool mode, preferably the D2D resource configuring module is particularly configured to determine D2D resource pool configurations corresponding to the respective QoS levels; and the D2D resource configuration information transmitting module is particularly configured to transmit information about the D2D resource pool configurations corresponding to the respective QoS levels to the UE. Further to this, the information about the D2D resource pool configurations includes at least one of:

information about time-frequency resources in the D2D resource pools;

information about resource configuration periodicities of the D2D resource pools;

information about offsets of the D2D resource pools;

information about MCS levels for use in transmission of data over resources in the D2D resource pools;

information about the numbers of retransmissions in transmission of data over resources in the D2D resource pools;

information about power allocation in transmission of data over resources in the D2D resource pools; and parameters related to a collision detection mechanism for use in selection among resources in D2D resource pools.

Here the resources in the resource pools corresponding to the different QoS levels may be different. Alternatively resources in a resource pool of a high QoS level include resources in a resource pool of a low QoS level, for example, the information about the time-frequency resources in the resource pool of the high QoS level include the information about the time-frequency resources in the resource pool of the low QoS level.

In order to ensure reasonable division of resources into the respective QoS levels, the D2D resource pool configurations corresponding to the respective QoS levels need to be maintained. They can be maintained by an access stratum node, e.g., an eNB, a UE, a network element, etc., which can function as a central control node, or a resource control node at another access stratum; or they can be maintained by a higher-layer node, e.g., a ProSe node. Preferably the D2D resource pool configurations corresponding to the respective QoS levels can be maintained by detecting the amounts of transmitted service data over the resources in the respective D2D resource pools, judging the reasonability about division of the resources into the different QoS levels, and adjusting the resources in the resource pools corresponding to the different QoS levels according to a result of judgment for the reasonability about division of the resources. Optionally the apparatus for allocating a D2D resource according to the embodiment of the application further includes a D2D resource configuration maintaining module configured to maintain the D2D resource pool configurations corresponding to the respective QoS levels, and reference can be made to the description above of the maintenance of the D2D resource pool configurations for details thereof.

In the dedicated resource mode, preferably the D2D resource configuring module is particularly configured to receive a resource request of the LIE, carrying information about the QoS levels; and to determine the D2D resource configurations corresponding to the QoS levels indicated by the information about the QoS levels. Accordingly the D2D resource configuration information transmitting module is particularly configured to transmit the information about the determined D2D resource configurations, and D2D service indication information to the UE, where the D2D service indication information indicates D2D services corresponding to the information about the determined D2D resource configuration; or to transmit the information about the determined D2D resource configurations, and QoS level indication information to the UE, where the QoS level indication information indicates the QoS levels corresponding to the information about the determined D2D resource configurations.

In the dedicated resource mode, preferably the information about the D2D resource configurations can include but will not be limited to at least one of:
  information about time-frequency resources among D2D resources;
  information about MCS levels for use in transmission of data over D2D resources;
  information about the numbers of retransmissions in transmission of data over D2D resources; and
  information about transmit power in transmission of data over D2D resources.

Based upon the same inventive idea as the application, an embodiment of the application further provides an access stratum resource control node including a processor and a radio frequency unit, where:
  the processor is configured to determine D2D resource configurations corresponding to QoS levels; and
  the radio frequency unit is configured to transmit information about the determined D2D resource configurations corresponding to the QoS levels to a UE.

The access stratum resource control node according to the embodiment of the application can include but will not be limited to an eNB, a central control node, etc.

In the access stratum resource control node according to the embodiment of the application, a D2D resource is configured according to a QoS level of a D2D service, and information about the D2D resource configuration corresponding to the QoS level of the D2D service is transmitted to the UE. Stated otherwise, the D2D resource can be allocated for the UE by taking into account a transmission demand for the D2D service an that the QoS of D2D transmission can be guaranteed based upon the correspondence relationship between the QoS level and the D2D resource, so (particularly in the case of CSMA) a transmission resource for transmitting a service with a high required QoS will not be preempted by the D2D service with a low required QoS so that the former service will not be blocked, and the efficiency of allocating a D2D resource of the system can be further improved without discouraging the transmission demand for the D2D service.

Based upon the same inventive idea as the application, an embodiment of the application further provides an apparatus for transmitting D2D data, and as illustrated in FIG. 6 the apparatus includes:
  a D2D transmission resource selecting module configured to select transmission resources for D2D services to be transmitted, according to received information about D2D resource configurations corresponding to QoS levels; and
  a D2D data transmitting module configured to transmit data of the D2D services over the selected transmission resources.

In the apparatus for transmitting D2D data according to the embodiment of the application, a D2D transmission resource is selected according to a QoS level. Stated otherwise, the D2D transmission resource can be selected by taking into account a transmission demand for a D2D service so that the QoS of D2D transmission can be guaranteed based upon the correspondence relationship between the QoS level and the D2D resource, so (particularly in the case of CSMA) a transmission resource for transmitting a service with a high required QoS will not be preempted by the D2D service with a low required QoS so that the former service will not be blocked, and the efficiency of allocating a D2D resource of the system can be further improved without discouraging the transmission demand for the D2D service.

In the common resource pool mode, preferably the D2D transmission resource selecting module is particularly configured to determine D2D resource pools corresponding to the QoS levels of the D2D services to be transmitted; and to select the transmission resources in the determined D2D resource pools, for the D2D services to be transmitted, according to received information about D2D resource pool configurations corresponding to the respective QoS levels.

In the dedicated resource mode, preferably the apparatus for transmitting D2D data according to the embodiment of the application can further include a resource requesting module configured to send a resource request carrying information about the QoS levels of the D2D services to be transmitted; and the D2D transmission resource selecting module is particularly configured to select the transmission resources for the D2D services to be transmitted, according to the received information about the D2D resource configurations corresponding to the QoS levels of the D2D services to be transmitted, where the information about the D2D resource configurations corresponding to the QoS levels of the D2D services to be transmitted is transmitted by a resource request receiver in response to the resource request.

Further to any one of the embodiments above of the apparatus for transmitting D2D data, if there are a number of D2D services to be transmitted, then transmission resources can be selected only for those D2D services to be transmitted at high QoS levels, and service data of only those D2D services can be transmitted, or transmission resources can be selected for the D2D services to be transmitted by guaranteeing transmit power of preferentially those services to be transmitted at high QoS levels; or transmission resources can be selected for the D2D services to be transmitted by selecting transmission resources preferentially for those services to be transmitted at high QoS levels.

Preferably if the number of D2D services allowed to be transmitted is less than the number of D2D services to be transmitted, then transmission resources can be selected only for those services to be transmitted at high QoS levels, and service data of only those D2D services can be transmitted.

Preferably if there is limited transmit power of at least two D2D services to be transmitted, then transmission resources can be selected for the D2D services to be transmitted, by guaranteeing the transmit power of preferentially those services to be transmitted at high QoS levels.

Preferably if available transmission resources can not satisfy a resource demand for at least two D2D services to be transmitted, then transmission resources can be selected for the D2D services to be transmitted, by selecting a transmission resource preferentially for a service to be transmitted at a high QoS level.

Further to any one of the embodiments above of the apparatus for transmitting D2D data, preferably the D2D transmission selecting module is particularly configured, if the transmission resources selected for the D2D services to be transmitted, according to the received information about the D2D resource configurations corresponding to the QoS levels of the D2D services to be transmitted can not satisfy transmission requirements of the D2D services to be transmitted, to select the transmission resources for the D2D services to be transmitted, according to information about D2D resource configurations of low QoS levels which are lower than the QoS levels of the D2D services to be transmitted.

Based upon the same inventive idea as the application, an embodiment of the application further provides a user equipment including a processor and a radio frequency unit, where:
- the processor is configured to select transmission resources for D2D services to be transmitted, according to received information about D2D resource configurations corresponding to QoS levels; and
- the radio frequency unit is configured to transmit data of the D2D services over the selected transmission resources.

In the user equipment according to the embodiment of the application, a D2D transmission resource is selected according to a QoS level. Stated otherwise, the D2D transmission resource can be selected by taking into account a transmission demand for a D2D service so that the QoS of D2D transmission can be guaranteed based upon the correspondence relationship between the QoS level and the D2D resource, so (particularly in the case of CSMA) a transmission resource for transmitting a service with a high required QoS will not be preempted by the D2D service with a low required QoS so that the former service will not be blocked, and the efficiency of allocating a D2D resource of the system can be further improved without discouraging the transmission demand for the D2D service.

DETAILED DESCRIPTION OF THE EMBODIMENTS

Embodiments of the application provide a solution to QoS-based allocation and selection of a D2D data transmission resource, and with this solution, allocation of the D2D transmission resource can better match with a D2D service transmission attribute without discouraging a D2D service transmission demand or degrading the efficiency of allocating an air interface D2D resource. A core idea of the embodiments of the application lies in that D2D resources for services with different QoS's are allocated, and D2D data can be transmitted by selecting a D2D transmission resource corresponding to a QoS attribute of a D2D service to be transmitted.

The technical solution according to the embodiments of the application will be described below in details with reference to the drawings.

Figure 1:
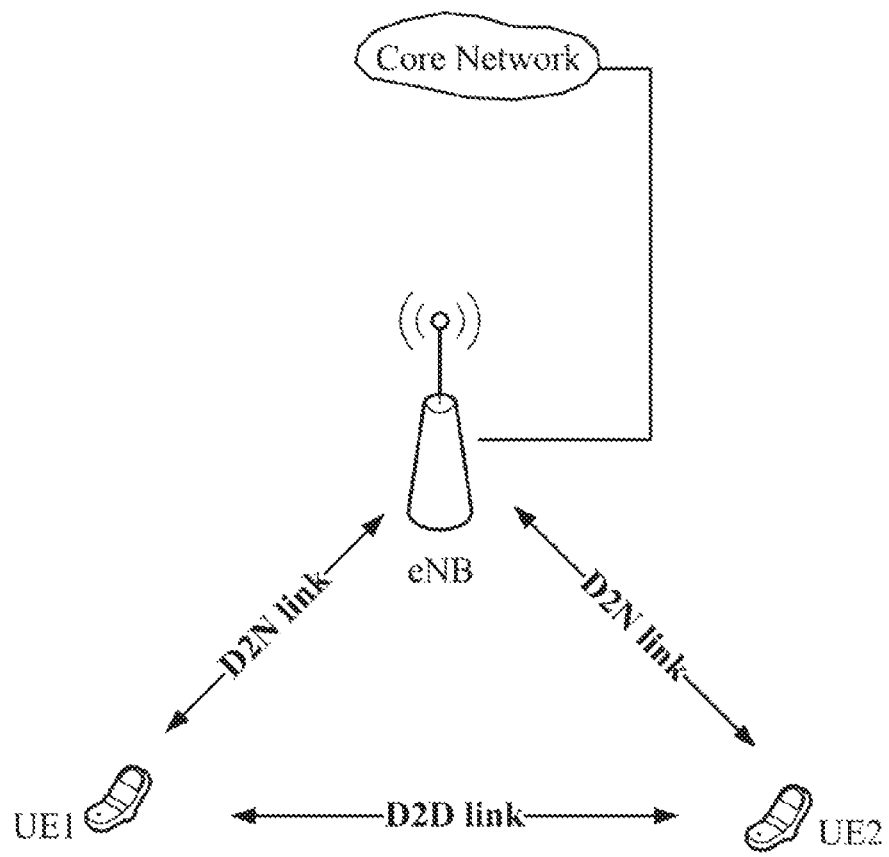
FIG. 1 is a schematic diagram of D2D communication.
Figure 2:
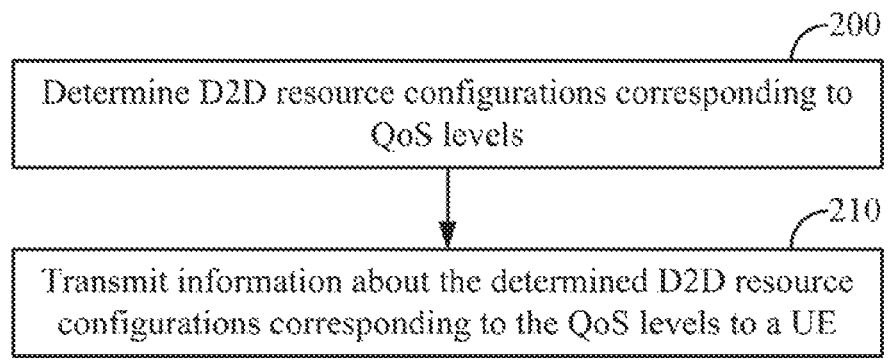
FIG. 2 is a flow chart of a method for allocating a D2D resource according to an embodiment of the application.

FIG. 2 illustrates a method for allocating a D2D resource according to an embodiment of the application, where the method particularly includes the following operations:

The step 200 is to determine D2D resource configurations corresponding to QoS levels.

Here D2D resources corresponding to the different QoS levels can be configured by an access stratum resource control node, e.g., an eNB, a central control node, etc., or can be configured by a higher layer, e.g., a ProSe node, etc.

Accordingly if the D2D resources corresponding to the different QoS levels are configured by the present node, then the D2D resource configurations corresponding to the QoS levels will be determined according to the configuration by the present node; and if the D2D resources corresponding to the different QoS levels are configured by another node, then D2D resources corresponding to the different QoS levels will be obtained from the other node, and the D2D resources configuration corresponding to the QoS levels will be determined according to the obtained information.

The step 210 is to transmit information about the determined D2D resource configurations corresponding to the QoS levels to a UE.

In the method for allocating a D2D resource according to the embodiment of the application, a D2D resource is configured according to a QoS level of a D2D service, and information about the D2D resource configuration corresponding to the QoS level of the D2D service is transmitted to the UE. Stated otherwise, the D2D resource can be allocated for the UE by taking into account a transmission demand for the D2D service so that the QoS of D2D transmission can be guaranteed based upon the correspondence relationship between the QoS level and the D2D resource, so (particularly in the case of CSMA) a transmission resource for transmitting a service with a high required QoS will not be preempted by the D2D service with a low required QoS so that the former service will not be blocked, and the efficiency of allocating a D2D resource of the system can be further improved without discouraging the transmission demand for the D2D service.

The method for allocating a D2D resource according to the embodiment of the application can be applicable to both a D2D discovery scenario and a D2D communication scenario.

D2D resource allocation modes typically include the common resource pool mode and the dedicated resource mode. The method for allocating a D2D resource according to the embodiment of the application will be described below taking these two modes respectively as examples.

In the common resource pool mode:

The D2D resource configurations corresponding to the QoS levels can be determined by determining D2D resource pool configurations corresponding to the respective QoS levels.

Particularly D2D resource pool configurations corresponding to the respective QoS levels in the LTE system can be determined, or D2D resource configurations corresponding to the respective QoS levels in a home area of a D2D service of the UE can be determined.

Particularly the D2D resource configurations corresponding to the QoS levels can be determined according to the configuration by the access stratum resource control node, or the D2D resource configurations corresponding to the QoS levels can be determined according to the configuration by the higher-layer node.

Accordingly the information about the determined D2D resource configurations corresponding to the QoS levels can be transmitted to the UE by transmitting information about the D2D resource pool configurations corresponding to the respective QoS levels to the UE.

Particularly information about the D2D resource pool configurations corresponding to the respective QoS levels in the LTE system can be transmitted to the UE, or information about the D2D resource configurations corresponding to the respective QoS levels in the home area of the D2D service of the UE can be transmitted to the UE.

Further to the respective embodiments in the common resource pool, the information about the D2D resource pool configurations can include but will not be limited to at least one of:

Information about time-frequency resources in the D2D resource pools;

Information about resource configuration periodicities of the D2D resource pools;

Information about offsets of the D2D resource pools;

Information about Modulation and Coding Scheme (MCS) levels for use in transmission of data over resources in the D2D resource pools;

Information about the numbers of retransmissions in transmission of data over resources in the D2D resource pools;

Information about power allocation in transmission of data over resources in the D2D resource pools; and Parameters related to a collision detection mechanism for use in selection among resources in D2D resource pools.

Here the information about the offsets of the D2D resource pools can be information about temporal offsets of the D2D resource pools and/or information about frequency offsets of the D2D resource pools.

Here the parameters related to the collision detection mechanism for use in selection of the resources in the D2D resource pools can include but will not be limited to a collision back-off length of time, etc.

Here the resources in the resource pools corresponding to the different QoS levels may be different. Alternatively resources in a resource pool of a high QoS level include resources in a resource pool of a low QoS level, for example, the information about the time-frequency resources in the resource pool of the high QoS level include the information about the time-frequency resources in the resource pool of the low QoS level.

Taking an online scenario as an example, a preferred embodiment of the method for allocating a D2D resource in a common resource pool is as follows:

There are resource pools corresponding to different QoS levels in the LTE system. Since a QoS reflects information about a transmission delay, reliability, rate, and other attributes of a D2D service, the different resource pools in the LTE system correspond to different delay priorities, rate priorities, and/or transmission reliability.

If the eNB knows in advance that there are three QoS levels, denoted as QoS levels 2 and 3 respectively, corresponding to D2D services in the present LTE system, through a core network or as pre-configured, and the eNB obtains in advance configurations of D2D resource pools corresponding to these three QoS levels respectively through the core network or as pre-configured, then the eNB can allocate a D2D resource by determining the D2D resource pool configurations corresponding to these three QoS levels respectively, and notifying the UE of information about the D2D resource pool configurations corresponding to these three QoS levels respectively through broadcasting, dedicated signaling, etc., where reference can be made for the description of the embodiment above for the information about the D2D resource pool configurations, so a repeated description thereof will be omitted here.

In order to ensure reasonable division of resources into the respective QoS levels, the D2D resource pool configurations corresponding to the respective QoS levels need to be maintained, where they can be maintained by an access stratum node, e.g., an eNB, a UE, a network element, etc., which can function as a central control node, or a resource control node at another access stratum; or they can be maintained by a higher-layer node, e.g., a ProSe node. Preferably the D2D resource pool configurations corresponding to the respective QoS levels can be maintained by detecting the amounts of transmitted service data over the resources in the respective D2D resource pools, judging the reasonability about division of the resources into the different QoS levels, and adjusting the resources in the resource pools corresponding to the different QoS levels according to a result of judgment for the reasonability about division of the resources.

Here the reasonability about division of the resources into the different QoS levels can be judged, and the resources in the resource pools corresponding to the different QoS levels can be adjusted, in a number of particular implementations, where they can be judged and adjusted particularly as demanded for the real services. Taking an online scenario as an example, in a preferred embodiment of the method for allocating a D2D resource in a common resource pool, the resource pools can be maintained as follows:

If D2D resource pools corresponding to the QoS level 1 and the QoS level 2 respectively are configured in the system, where the QoS level 1 is a high QoS level, and the QoS level 2 is a low QoS level, then:

The UE transmits the D2D service by counting usages and confliction conditions of resources in the respective resource pools, and reflects them to the maintenance network element (e.g., the eNB) periodically or in real time. For example, if the UE detects a resource selection success ratio of 10% in the resource pool corresponding to the QoS level 1, and a resource selection success ratio of 90% in the resource pool corresponding to the QoS level 2, then the UE will notify the eNB of this through RRC signaling or otherwise.

The maintenance network element determines allocation conditions of the resource pools per QoS level according to the information reported by the UEs in its maintenance area, and thereafter increases the number of time-frequency resources divided into the resource pool of the QoS level 1, and decreases the number of time-frequency resources divided into the resource pool of the QoS level 2.

In the dedicated resource mode:

The D2D resource configurations corresponding to the QoS levels can be determined by receiving a resource request of the UE carrying the information about the QoS levels, and determining the D2D resource configurations corresponding to the QoS levels indicated by the information about the QoS levels.

Optionally the D2D resource configurations can alternatively be determined by referring to the information about the QoS levels carried in the resource request.

Here the information about the QoS levels can be identification information of the QoS levels, delay information corresponding to the QoS levels, rate information corresponding to the QoS levels, transmission reliability information corresponding to the QoS levels, etc.

The information about the determined D2D resource configuration corresponding to the QoS levels can be transmitted to the UE by transmitting the information about the determined D2D resource configurations, and D2D service indication information to the UE, where the D2D service indication information indicates the D2D services corresponding to the information about the determined D2D resource configuration; or the information about the determined D2D resource configurations corresponding to the QoS levels can be transmitted to the UE by transmitting the information about the determined D2D resource configurations, and QoS level indication information to the UE, where the QoS level indication information indicates the QoS levels corresponding to the information about the determined D2D resource configurations.

It shall be noted that the QoS levels or the D2D services corresponding to the information about the allocated D2D resource configurations may not be indicated. For example, if the resource request of the UE relates to one specific QoS level, then a D2D resource will be configured in response to the resource request, and information about the D2D resource configuration will be returned without carrying any D2D service indication information or QoS indication information.

Further to the respective embodiments in the dedicated resource mode, the information about the D2D resource configurations can include but will not be limited to at least one of:

Information about time-frequency resources among D2D resources;

Information about MCS levels for use in transmission of data over D2D resources;

Information about the numbers of retransmissions in transmission of data over D2D resources; and Information about transmit power in transmission of data over D2D resources.

Taking an online scenario as an example, a preferred embodiment of the method for allocating a MD resource as a dedicated resource is as follows:

The eNB receives a request of the UE for a dedicated resource of a D2D service, where the resource request carries information about a QoS level of the D2D service, determines the QoS level according to the information about the QoS level, and allocates a dedicated D2D resource for the QoS level, that is, determines a D2D resource configuration corresponding to the QoS level; and transmits information about the determined D2D resource configuration, and QoS level indication information to the UE, where reference can be made to the description of the embodiment above for the information about the D2D resource configuration, so a repeated description thereof will be omitted here.

Figure 3:
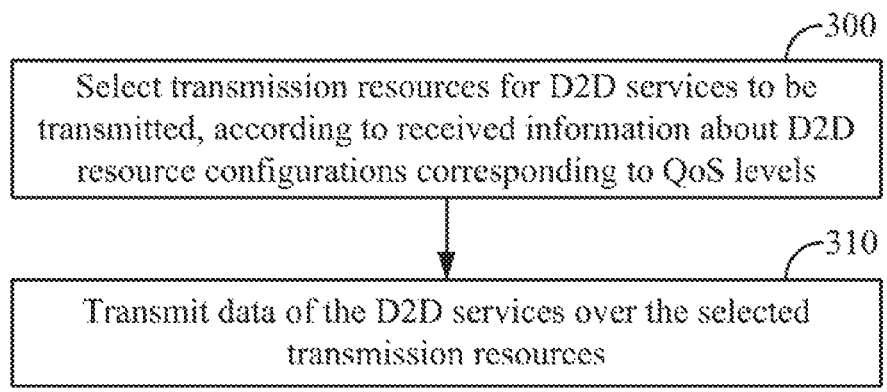
FIG. 3 is a flow chart of a method for transmitting D2D data according to an embodiment of the application.

FIG. 3 illustrates a flow chart of a method for transmitting D2D data according to an embodiment of the application, where the method particularly includes the following operations:

The step 300 is to select transmission resources for D2D services to be transmitted, according to received information about D2D resource configurations corresponding to QoS levels.

The step 310 is to transmit data of the D2D services over the selected transmission resources.

In the method for transmitting D2D data according to the embodiment of the application, a D2D transmission resource is selected according to a QoS level. Stated otherwise, the D2D transmission resource can be selected by taking into account a transmission demand for a D2D service so that the QoS of D2D transmission can be guaranteed based upon the correspondence relationship between the QoS level and the D2D resource, so (particularly in the case of CSMA) a transmission resource for transmitting a service with a high required QoS will not be preempted by the D2D service with a low required QoS so that the former service will not be blocked, and the efficiency of allocating a D2D resource of the system can be further improved without discouraging the transmission demand for the D2D service.

The method for transmitting D2D data according to the embodiment of the application can be applicable to both a D2D discovery scenario and a D2D communication scenario.

D2D resource allocation modes typically include the common resource pool mode and the dedicated resource mode. The method for transmitting D2D data according to the embodiment of the application will be described below taking these two modes respectively as examples.

In the common resource pool mode:

The transmission resources can be selected for the D2D services to be transmitted, according to the received information about the D2D resource configurations corresponding to the QoS levels by determining D2D resource pools corresponding to the QoS levels of the D2D services to be transmitted; and selecting the transmission resources in the determined D2D resource pools, for the D2D services to be transmitted, according to received information about D2D resource pool configurations corresponding to the respective QoS levels.

Here the information about the D2D resource pool configurations corresponding to the respective QoS levels is received in advance.

Particularly if there is a D2D service to be transmitted, then a higher layer at the UE side will transmit the D2D service to a lower layer while indicating information about a QoS level corresponding to the D2D service; and the lower layer at the UE side determines the QoS level of the D2D service according to the information about the QoS level, determines a D2D resource pool corresponding to the QoS level, and selects a transmission resource according to configuration information about the D2D resource pool.

Taking non-line scenario as an example, a preferred embodiment of the method for transmitting D2D data in a common resource pool is as follows:

If there are three QoS levels and D2D resource pools corresponding to the respective QoS levels in the system, then the UE will obtain information about resource pool configurations corresponding to these three QoS levels respectively from the eNB.

If there is a demand of the higher layer of the UE for a D2D service to be transmitted, then the higher layer of the UE will transmit data of the D2D service to an Access Stratum (AS) (e.g., a Media Access Control (MAC) layer) while transmitting information about a QoS level corresponding to the D2D service to the Access Stratum (AS).

The Access Stratum (AS) of the UE determines the QoS level of the D2D service according to the information about the QoS level, and further retrieves information about a D2D resource pool configuration corresponding to the QoS level, and selects a transmission resource according to the information about the D2D resource pool configuration.

The Access Stratum (AS) of the UE transmits D2D data using a transmission parameter corresponding to the selected transmission resource at a select point of time.

In the dedicated resource mode:

A resource request is further sent before the transmission resources are selected for the D2D services to be transmitted, where the resource requests carries the information about the QoS levels of the D2D services to be transmitted; and the transmission resources can be selected for the D2D services to be transmitted according to the received information about the D2D resource configurations corresponding to the QoS levels by selecting the transmission resources for the D2D services to be transmitted, according to the received information about the D2D resource configurations corresponding to the QoS levels of the D2D services to be transmitted, where the information about the D2D resource configurations corresponding to the QoS levels of the D2D services to be transmitted is transmitted by a resource request receiver in response to the resource request.

Particularly if the resource request relates to some specific QoS level or D2D service, then a D2D resource indicated by received information about a D2D resource configuration will be determined as a transmission resource to be selected. If the resource request receiver further transmits D2D service indication information or QoS level indication information, then the transmission resource will be selected according to the indication information.

Taking a on-line scenario as an example, a preferred embodiment of the method for transmitting D2D data over a dedicated resource is as follows:

The UE sends a resource request carrying the information about the QoS levels to the eNB, and receives the information about the D2D resource configurations, and the QoS level indication information, fed back by the eNB to thereby obtain the information about the D2D resource configurations corresponding to the QoS level 1 and the QoS level 2 respectively.

Here the UE can make the resource request in advance, or can make the resource request if there is a D2D service to be transmitted.

The higher layer of the UE has data of a D2D service at the QoS level 1 to be transmitted, and transmits the data of the D2D service at the QoS level 1 to the Access Stratum (AS), and the Access Stratum (AS) of the UE selects a D2D transmission resource according to the Information about the D2D resource configuration corresponding to the QoS level 1, and transmits the data of the D2D service over the selected transmission resource by encapsulating only the data of the D2D service at the QoS level 1 into one MAC PDU and transmitting the MAC PDU both a transmission rule and a transmission parameter in the D2D resource configuration corresponding to the QoS level 1.

Further to any one of the embodiments above of the method for transmitting D2D data, if there are a number of D2D services to be transmitted, then transmission resources can be selected only for those D2D services to be transmitted at high QoS levels, and service data of only those D2D services can be transmitted, or transmission resources can be selected for the D2D services to be transmitted by guaranteeing transmit power of preferentially those services to be transmitted at high QoS levels; or transmission resources can be selected for the D2D services to be transmitted by selecting transmission resources preferentially for those services to be transmitted at high QoS levels.

Preferably if the number of D2D services allowed to be transmitted is less than the number of MD services to be transmitted, then transmission resources can be selected only for those services to be transmitted at high QoS levels, and service data of only those D2D services can be transmitted.

Taking a on-line scenario as an example, another preferred embodiment of the method for transmitting D2D data over a dedicated resource is as follows:

If the UE has concurrent D2D services at the QoS level 1, the QoS level 2, and the QoS level 3 to be transmitted, but only one D2D service is allowed to be transmitted via an air interface, then firstly a D2D service at a high QoS level will be transmitted. For example, if the QoS level 1 is the highest QoS level, then a transmission resource can be selected preferentially for the D2D service at the QoS level 1, and data of preferentially the D2D service at the QoS level 1 can be transmitted. If both the QoS level 1 and the QoS level 2 are the highest QoS levels, then a transmission resource can be selected for one of the D2D services, and data of the one D2D service can be transmitted, in around-robin manner, randomly, etc.

Taking non-line scenario as an example, another preferred embodiment of the method for transmitting D2D data over a dedicated resource is as follows:

The UE sends a resource request carrying the information about the QoS levels to the eNB, and receives the information about the D2D resource configurations, and the QoS level indication information, fed back by the eNB, where the UE can make the resource request in advance, or can make the resource request if there is a D2D service to be transmitted.

If only one D2D service is allowed to be transmitted via the air interface, then firstly a D2D service at a high QoS level will be transmitted.

For example, if the higher layer of the UE has D2D services at the QoS level 1 and the QoS level 2 to be transmitted, where the QoS level 1 is higher than the QoS level 2, then the higher layer of the UE can transmit only data of the D2D service at the QoS level 1 to the Access Stratum (AS) (or Access Stratum (AS)-based D2D service transmission level indication information); and for the QoS level 1, the Access Stratum of the UE can select a transmission resource for the D2D service at the QoS level 1 according to the received information about the D2D resource configuration, and QoS level indication information, and transmit the data of the D2D service at the QoS level 1 over the selected D2D transmission resource.

For example, if the higher layer of the UE has D2D services at the QoS level 1, the QoS level 2, and the QoS level 3 to be transmitted, where the QoS level 1 is the same as the QoS level 2, and both of them are higher than the QoS level 3, then the higher layer of the UE can transmit data of the D2D service at the QoS level 1 or the QoS level 1 to the Access Stratum (AS) in a round-robin manner, randomly, etc. Reference can be made to the description of the previous embodiment for the process at the Access Stratum (AS), so a repeated description thereof will be omitted here.

Preferably if there is limited transmit power of at least two D2D services to be transmitted, then transmission resources can be selected for the D2D services to be transmitted, by guaranteeing the transmit power of preferentially those services to be transmitted at high QoS levels.

Taking a on-line scenario as an example, another preferred embodiment of the method for transmitting D2D data over a dedicated resource is as follows:

The UE sends a resource request carrying the information about the QoS levels to the eNB, and receives the information about the D2D resource configurations, and the QoS level indication information, fed back by the eNB, where the UE can make the resource request in advance, or can make the resource request if there is a D2D service to be transmitted.

If the UE has concurrent D2D services at the QoS level 1 and the QoS level 2 being transmitted in the same sub-frame, and transmit power of the UE is limited, then the UE can perform a power back-off process by firstly guaranteeing the transmit power at which the D2D service at the QoS level 1 (i.e., a high QoS level) is transmitted.

Preferably if available transmission resources can not satisfy a resource demand for at least two D2D services to be transmitted, then transmission resources can be selected for the D2D services to be transmitted, by selecting a transmission resource preferentially for a service to be transmitted at a high QoS level.

Further to any one of the embodiments above of the method for transmitting D2D data, preferably the transmission resources can be selected for the D2D services to be transmitted, according to the received information about the D2D resource configurations corresponding to the QoS levels as follows: if the transmission resources selected for the D2D services to be transmitted, according to the received information about the D2D resource configurations corresponding to the QoS levels of the D2D services to be transmitted can not satisfy transmission requirements of the D2D services to be transmitted, then the transmission resources can be selected for the D2D services to be transmitted, according to information about D2D resource configurations of low QoS levels which are lower than the QoS levels of the D2D services to be transmitted.

Here the function of preempting a D2D resource of a D2D service at a low QoS level by a D2D service at a high QoS level can be configured by the access stratum node (e.g., the eNB, the CE, etc.), or can be enabled or disabled under a pre-configured condition.

Taking a on-line scenario as an example, another preferred embodiment of the method for transmitting D2D data in a common resource pool is as follows:

If the UE obtains information about D2D resource pool configurations corresponding to the QoS level 1 (a high QoS level) and a QoS level 2 respectively.

The function of preempting a D2D resource of a D2D service at a low QoS level by a D2D service at a high QoS level has been configured by an access stratum resource control node, or can be pre-configured to be enabled.

If the higher layer of the UE has a D2D service at the QoS level 1 to be transmitted, then the higher layer of the UE can transmit data of the D2D service to the Access Stratum (AS) (e.g., the MAC layer) of the UE while transmitting the information about the QoS level 1 to the Access Stratum (AS); and the Access Stratum (AS) of the UE can retrieve the information about the D2D resource pool configuration corresponding to the QoS level 1, and select a transmission resource according to the information about the D2D resource pool configuration, but may not select any appropriate transmission resource (possibly due to the busy service or other reasons), no the UE can further select a transmission resource according to the information about the D2D resource pool configuration corresponding to the QoS level 2, and if the transmission resource has been selected successfully in the D2D resource pool corresponding to the QoS level 2, then the UE can transmit the D2D service at the QoS level 1 according to the D2D resource pool configuration corresponding to the QoS level 2.

Here the resource pool configuration corresponding to the QoS level 2 can be applied to all the configurations, or can be applied only to the time-frequency resource configuration in the resource pool corresponding to the QoS level 2, and the resource pool configuration corresponding to the QoS level 1 can still be applied to the other configurations.

Taking non-line scenario as an example, another preferred embodiment of the method for transmitting D2D data over a dedicated resource is as follows:

The UE sends a resource request carrying the information about the QoS levels to the eNB, and receives the information about the D2D resource configurations, and the QoS level indication information, fed back by the eNB to thereby obtain the information about the D2D resource configurations corresponding to the QoS level 1 and the QoS level 2 respectively.

The function of preempting a D2D resource of a D2D service at a low QoS level by a D2D service at a high QoS level has been configured by an access stratum resource control node, or can be pre-configured to be enabled.

The higher layer of the UE has data of a D2D service at the QoS level 1 to be transmitted, and the higher layer of the UE transmits the data of the D2D service to the Access Stratum (AS) (i.e., the MAC layer) of the UE while transmitting the information about the QoS level 1 to the Access Stratum (AS); and the Access Stratum (AS) of the UE selecting a transmission resource detects that a D2D resource corresponding to the QoS level 1 is being accessed by data of another D2D service at the QoS level 1 (or a time-frequency resource which can be available soon is a D2D resource corresponding to the QoS level 2), then the Access Stratum (AS) of the UE can select the D2D resource configuration corresponding to the QoS level 2 directly, and transmit the data of the D2D service at the QoS level 1.

Here the resource pool configuration corresponding to the QoS level 2 can be applied to all the configurations, or can be applied only to the time-frequency resource configuration in the resource pool corresponding to the QoS level 2, and the resource pool configuration corresponding to the QoS level 1 can still be applied to the other configurations.

Figure 4:
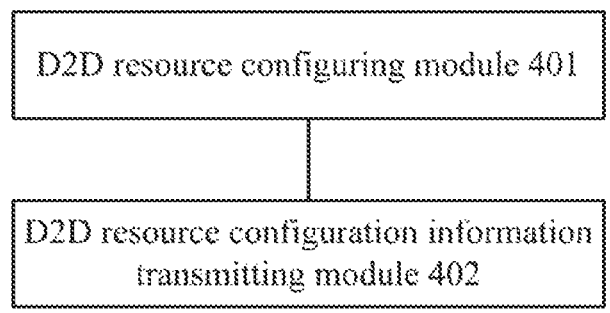
FIG. 4 is a schematic diagram of an apparatus for allocating a D2D resource according to an embodiment of the application.

Based upon the same inventive idea as the method above, an embodiment of the application provides an apparatus for allocating a D2D resource, and as illustrated in FIG. 4, the apparatus includes:

A D2D resource configuring module 401 is configured to determine D2D resource configurations corresponding to QoS levels; and A D2D resource configuration information transmitting module 402 is configured to transmit information about the determined D2D resource configurations corresponding to the QoS levels to a UE.

In the apparatus for allocating a D2D resource according to the embodiment of the application, a D2D resource is configured according to a QoS level of a D2D service, and information about the D2D resource configuration corresponding to the QoS level of the D2D service is transmitted to the UE. Stated otherwise, the D2D resource can be allocated for the UE by taking into account a transmission demand for the D2D service so that the QoS of D2D transmission can be guaranteed based upon the correspondence relationship between the QoS level and the D2D resource, so (particularly in the case of CSMA) a transmission resource for transmitting a service with a high required QoS will not be preempted by the D2D service with a low required QoS so that the former service will not be blocked, and the efficiency of allocating a D2D resource of the system can be further improved without discouraging the transmission demand for the D2D service.

In the common resource pool mode, preferably the D2D resource configuring module 401 is particularly configured to determine D2D resource pool configurations corresponding to the respective QoS levels; and the D2D resource configuration information transmitting module 402 is particularly configured to transmit information about the D2D resource pool configurations corresponding to the respective QoS levels to the UE. Further to this, the information about the D2D resource pool configurations includes at least one of:

Information about time-frequency resources in the D2D resource pools;

Information about resource configuration periodicities of the D2D resource pools;

Information about offsets of the D2D resource pools;

Information about MCS levels for use in transmission of data over resources in the D2D resource pools;

Information about the numbers of retransmissions in transmission of data over resources in the D2D resource pools;

Information about power allocation in transmission of data over resources in the D2D resource pools; and Parameters related to a collision detection mechanism for use in selection among resources in D2D resource pools.

Here the resources in the resource pools corresponding to the different QoS levels may be different. Alternatively resources in a resource pool of a high QoS level include resources in a resource pool of a low QoS level, for example, the information about the time-frequency resources in the resource pool of the high QoS level include the information about the time-frequency resources in the resource pool of the low QoS level.

In order to ensure reasonable division of resources into the respective QoS levels, the D2D resource pool configurations corresponding to the respective QoS levels need to be maintained. They can be maintained by an access stratum node, e.g., an eNB, a UE, a network element, etc., which can function as a central control node, or a resource control node at another access stratum; or they can be maintained by a higher-layer node, e.g., a ProSe node. Preferably the D2D resource pool configurations corresponding to the respective QoS levels can be maintained by detecting the amounts of transmitted service data over the resources in the respective D2D resource pools, judging the reasonability about division of the resources into the different QoS levels, and adjusting the resources in the resource pools corresponding to the different QoS levels according to a result of judgment for the reasonability about division of the resources. Optionally the apparatus for allocating a D2D resource according to the embodiment of the application further includes a D2D resource configuration maintaining module configured to maintain the D2D resource pool configurations corresponding to the respective QoS levels, and reference can be made to the description above of the maintenance of the D2D resource pool configurations for details thereof.

In the dedicated resource mode, preferably the D2D resource configuring module 401 is particularly configured to receive a resource request of the UE, carrying information about the QoS levels; and to determine the D2D resource configurations corresponding to the QoS levels indicated by the information about the QoS levels. Accordingly the D2D resource configuration information transmitting module 402 is particularly configured to transmit the information about the determined D2D resource configurations, and D2D service indication information to the UE, where the D2D service indication information indicates D2D services corresponding to the information about the determined D2D resource configuration; or to transmit the information about the determined D2D resource configurations, and QoS level indication information to the UE, where the QoS level indication information indicates the QoS levels corresponding to the information about the determined D2D resource configurations.

In the dedicated resource mode, preferably the information about the D2D resource configurations can include but will not be limited to at least one of:

Information about time-frequency resources among D2D resources;

Information about MCS levels for use in transmission of data over D2D resources;

Information about the numbers of retransmissions in transmission of data over D2D resources; and Information about transmit power transmission of data over D2D resources.

Figure 5:
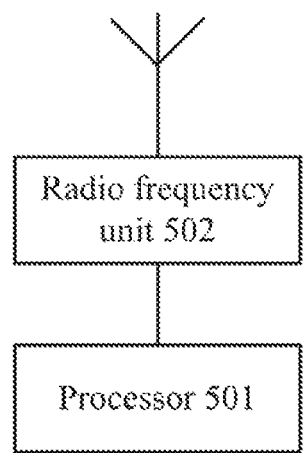
FIG. 5 is a schematic diagram of an access stratum resource control node according to an embodiment of the application.

Based upon the same inventive idea as the application, an embodiment of the application further provides an access stratum resource control node, and as illustrated in FIG. 5, the access stratum resource control node includes a processor 501 and a radio frequency unit 502, where:

The processor 501 is configured to determine D2D resource configurations corresponding to QoS levels; and The radio frequency unit 502 is configured to transmit information about the determined D2D resource configurations corresponding to the QoS levels to a UE.

The access stratum resource control node according to the embodiment of the application can include but will not be limited to an eNB, a central control node, etc.

In the access stratum resource control node according to the embodiment of the application, a D2D resource is configured according to a QoS level of a D2D service, and information about the D2D resource configuration corresponding to the QoS level of the D2D service is transmitted to the UE. Stated otherwise, the D2D resource can be allocated for the UE by taking into account a transmission demand for the D2D service so that the QoS of D2D transmission can be guaranteed based upon the correspondence relationship between the QoS level and the D2D resource, so (particularly in the case of CSMA) a transmission resource for transmitting a service with a high required QoS will not be preempted by the D2D service with a low required QoS so that the former service will not be blocked, and the efficiency of allocating a D2D resource of the system can be further improved without discouraging the transmission demand for the D2D service.

Figure 6:
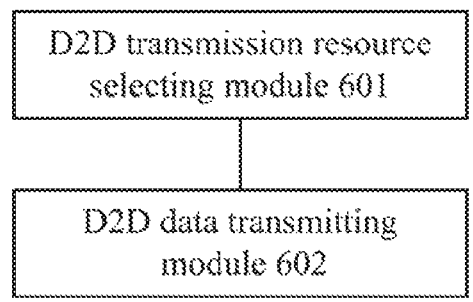
FIG. 6 is a schematic diagram of an apparatus for transmitting D2D data according to an embodiment of the application.

Based upon the same inventive idea as the application, an embodiment of the application further provides an apparatus for transmitting D2D data, and as illustrated in FIG. 6, the apparatus includes:

A D2D transmission resource selecting module 601 is configured to select transmission resources for D2D services to be transmitted, according to received information about D2D resource configurations corresponding to QoS levels; and A D2D data transmitting module 602 is configured to transmit data of the D2D services over the selected transmission resources.

In the apparatus for transmitting D2D data according to the embodiment of the application, a D2D transmission resource is selected according to a QoS level. Stated otherwise, the D2D transmission resource can be selected by taking into account a transmission demand for a D2D service so that the QoS of D2D transmission can be guaranteed based upon the correspondence relationship between the QoS level and the D2D resource, so (particularly in the case of CSMA) a transmission resource for transmitting a service with a high required QoS will not be preempted by the D2D service with a low required QoS so that the former service will not be blocked, and the efficiency of allocating a D2D resource of the system can be further improved without discouraging the transmission demand for the D2D service.

In the common resource pool mode, preferably the D2D transmission resource selecting module 601 is particularly configured to determine D2D resource pools corresponding to the QoS levels of the D2D services to be transmitted; and to select the transmission resources in the determined D2D resource pools, for the D2D services to be transmitted, according to received information about D2D resource pool configurations corresponding to the respective QoS levels.

In the dedicated resource mode, preferably the apparatus for transmitting D2D data according to the embodiment of the application can further include a resource requesting module configured to send a resource request carrying information about the QoS levels of the D2D services to be transmitted; and the D2D transmission resource selecting module 601 is particularly configured to select the transmission resources for the D2D services to be transmitted, according to the received information about the D2D resource configurations corresponding to the QoS levels of the D2D services to be transmitted, where the information about the D2D resource configurations corresponding to the QoS levels of the D2D services to be transmitted is transmitted by a resource request receiver in response to the resource request.

Further to any one of the embodiments above of the apparatus for transmitting D2D data, if there are a number of D2D services to be transmitted, then transmission resources can be selected only for those D2D services to be transmitted at high QoS levels, and service data of only those D2D services can be transmitted, or transmission resources can be selected for the D2D services to be transmitted by guaranteeing transmit power of preferentially those services to be transmitted at high QoS levels; or transmission resources can be selected for the D2D services to be transmitted by selecting transmission resources preferentially for those services to be transmitted at high QoS levels.

Preferably if the number of D2D services allowed to be transmitted is less than the number of D2D services to be transmitted, then transmission resources can be selected only for those services to be transmitted at high QoS levels, and service data of only those D2D services can be transmitted.

Preferably if there is limited transmit power of at least two D2D services to be transmitted, then transmission resources can be selected for the D2D services to be transmitted, by guaranteeing the transmit power of preferentially those services to be transmitted at high QoS levels.

Preferably if available transmission resources can not satisfy a resource demand for at least two D2D services to be transmitted, then transmission resources can be selected for the D2D services to be transmitted, by selecting a transmission resource preferentially for a service to be transmitted at a high QoS level.

Further to any one of the embodiments above of the apparatus for transmitting D2D data, preferably the D2D transmission selecting module 601 is particularly configured, if the transmission resources selected for the D2D services to be transmitted, according to the received information about the D2D resource configurations corresponding to the QoS levels of the D2D services to be transmitted can not satisfy transmission requirements of the D2D services to be transmitted, to select the transmission resources for the D2D services to be transmitted, according to information about D2D resource configurations of low QoS levels which are lower than the QoS levels of the D2D services to be transmitted.

Figure 7:
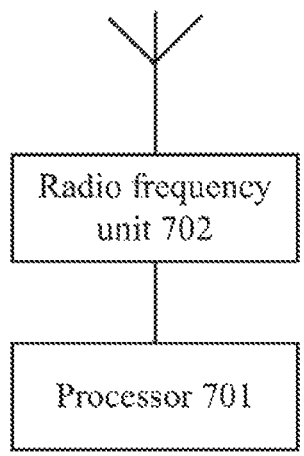
FIG. 7 is a schematic diagram of a user equipment according to an embodiment of the application.

Based upon the same inventive idea as the application, an embodiment of the application further provides a user equipment, and as illustrated in FIG. 7, the user equipment includes a processor 701 and a radio frequency unit 702, where:

The processor 701 is configured to select transmission resources for D2D services to be transmitted, according to received information about D2D resource configurations corresponding to QoS levels; and The radio frequency unit 702 is configured to transmit data of the D2D services over the selected transmission resources.

In the user equipment according to the embodiment of the application, a D2D transmission resource is selected according to a QoS level. Stated otherwise, the D2D transmission resource can be selected by taking into account a transmission demand for a D2D service so that the QoS of D2D transmission can be guaranteed based upon the correspondence relationship between the QoS level and the D2D resource, so (particularly in the case of CSMA) a transmission resource for transmitting a service with a high required QoS will not be preempted by the D2D service with a low required QoS so that the former service will not be blocked, and the efficiency of allocating a D2D resource of the system can be further improved without discouraging the transmission demand for the D2D service.

Those skilled in the art shall appreciate that the embodiments of the application can be embodied as a method, a system or a computer program product. Therefore the application can be embodied in the form of an all-hardware embodiment, an all-software embodiment or an embodiment of software and hardware in combination. Furthermore the application can be embodied in the form of a computer program product embodied in one or more computer useable storage mediums (including but not limited to a disk memory, a CD-ROM, an optical memory, etc.) in which computer useable program codes are contained.

The application has been described in a flow chart and/or a block diagram of the method, the device (system) and the computer program product according to the embodiments of the application. It shall be appreciated that respective flows and/or blocks in the flow chart and/or the block diagram and combinations of the flows and/or the blocks in the flow chart and/or the block diagram can be embodied in computer program instructions. These computer program instructions can be loaded onto a general-purpose computer, a specific-purpose computer, an embedded processor or a processor of another programmable data processing device to produce a machine so that the instructions executed on the computer or the processor of the other programmable data processing device create means for performing the functions specified in the flow(s) of the flow chart and/or the block(s) of the block diagram.

These computer program instructions can also be stored into a computer readable memory capable of directing the computer or the other programmable data processing device to operate in a specific manner so that the instructions stored in the computer readable memory create an article of manufacture including instruction means which perform the functions specified in the flow(s) of the flow chart and/or the block(s) of the block diagram.

These computer program instructions can also be loaded onto the computer or the other programmable data processing device so that a series of operational steps are performed on the computer or the other programmable data processing device to create a computer implemented process so that the instructions executed on the computer or the other programmable device provide steps for performing the functions specified in the flow(s) of the flow chart and/or the block(s) of the block diagram.

Although the preferred embodiments of the application have been described, those skilled in the art benefiting from the underlying inventive concept can make additional modifications and variations to these embodiments. Therefore the appended claims are intended to be construed as encompassing the preferred embodiments and all the modifications and variations coming into the scope of the application.

Evidently those skilled in the art can make various modifications and variations to the application without departing from the spirit and scope of the application. Thus the application is also intended to encompass these modifications and variations thereto so long as the modifications and variations come into the scope of the claims appended to the application and their equivalents.

The invention claimed is:

1. A method for allocating a Device to Device (D2D) resource, the method comprising:
   determining D2D resource configurations corresponding to quality of service levels of D2D services; and
   transmitting information about the D2D resource configurations corresponding to the quality of service levels of the D2D services to a user equipment;
   wherein determining the D2D resource configurations corresponding to the quality of service levels of the D2D services comprises:
   determining D2D resource pool configurations corresponding to the respective quality of service levels of the D2D services; and
   transmitting the information about the D2D resource configurations corresponding to the quality of service levels of the D2D services to the user equipment comprises:
   transmitting information about the D2D resource pool configurations corresponding to the respective quality of service levels of the D2D services to the user equipment.

2. The method according to claim 1, wherein the information about the D2D resource pool configurations comprises at least one of: information about time-frequency resources in the D2D resource pools; information about resource configuration periodicities of the D2D resource pools; information about offsets of the D2D resource pools; information about modulation and coding scheme levels for use in transmission of data over resources in the D2D resource pools; information about number of retransmissions in transmission of data over resources in the D2D resource pools; information about power allocation in transmission of data over resources in the D2D resource pools; and parameters related to a collision detection mechanism for use in selection among resources in D2D resource pools.

3. The method according to claim 1, wherein the D2D resource pool configurations corresponding to the respective quality of service levels of the D2D services are maintained by: detecting amounts of transmitted service data over the resources in the respective D2D resource pools, judging reasonability about division of the resources into the different quality of
   service levels of the D2D services, and adjusting the resources in the resource pools corresponding to the different quality of service levels of the D2D services according to a result of judgment for the reasonability about division of the resources.

4. The method according to claim 1, wherein resources in a resource pool of a high QoS level comprise resources in a resource pool of a low QoS level.

5. The method according to claim 1, wherein determining the D2D resource configurations corresponding to the quality of service levels of the D2D services comprises:
   receiving a resource request of the user equipment, carrying information about the quality of service levels of the D2D services; and determining the D2D resource configurations corresponding to the quality of service levels indicated by the information about the quality of service levels of the D2D services.

6. The method according to claim 5, wherein transmitting the information about the D2D resource configurations corresponding to the quality of service levels of the D2D services to the user equipment comprises:
   transmitting the information about the determined D2D resource configurations, and D2D service indication information to the user equipment, wherein the D2D service indication information indicates the D2D services corresponding to the information about the determined D2D resource configuration; or
   transmitting the information about the determined D2D resource configurations, and quality of service level indication information to the user equipment, wherein the quality of service level indication information indicates the quality of service levels corresponding to the information about the determined D2D resource configurations.

7. The method according to claim 5, wherein the information about the D2D resource configurations comprises at least one of:
   information about time-frequency resources among D2D resources;
   information about modulation and coding scheme levels for use in transmission of data over D2D resources;
   information about number of retransmissions in transmission of data over D2D resources; and information about transmit power in transmission of data over D2D resources.

8. A method for transmitting D2D data, the method comprising:
    selecting transmission resources for D2D services to be transmitted, according to received information about D2D resource configurations corresponding to quality of service levels of the D2D services; and
    transmitting data of the D2D services over the selected transmission resources;
    wherein selecting the transmission resources for the D2D services to be transmitted, according to the received information about the D2D resource configurations corresponding to the quality of service levels of the D2D services comprises:
        determining D2D resource pools corresponding to the quality of service levels of the D2D services to be transmitted; and selecting the transmission resources in the determined D2D resource pools, for the D2D services to be transmitted, according to received information about D2D resource pool configurations corresponding to the respective quality of service levels of the D2D services.

9. The method according to claim 8, wherein before the transmission resources are selected for the D2D services to be transmitted, the method further comprises:
    sending a resource request carrying information about the quality of service levels of the D2D services to be transmitted; and
    selecting the transmission resources for the D2D services to be transmitted, according to the received information about the D2D resource configurations corresponding to the quality of service levels of the D2D services comprises:
    selecting the transmission resources for the D2D services to be transmitted, according to the received information about the D2D resource configurations corresponding to the quality of service levels of the D2D services to be transmitted, wherein the information about the D2D resource configurations corresponding to the quality of service levels of the D2D services to be transmitted is transmitted by a resource request receiver in response to the resource request.

10. The method according to claim 8, wherein if there are a number of D2D services to be transmitted, then transmission resources are selected only for those D2D services to be transmitted at high quality of service levels, and service data of only those D2D services are transmitted; or
    if there are a number of D2D services to be transmitted, then transmission resources are selected for the D2D services to be transmitted by guaranteeing transmit power of preferentially those services to be transmitted at high quality of service levels; or
    if there are a number of D2D services to be transmitted, then transmission resources are selected for the D2D services to be transmitted by selecting transmission resources preferentially for those services to be transmitted at high quality of service levels.

11. The method according to claim 8, wherein if the number of D2D services allowed to be transmitted is less than the number of D2D services to be transmitted, then transmission resources are selected only for those services to be transmitted at high quality of service levels, and service data of only those D2D services are transmitted.

12. The method according to claim 8, wherein if there is limited transmit power of at least two D2D services to be transmitted, then transmission resources are selected for the D2D services to be transmitted, by guaranteeing the transmit power of preferentially those services to be transmitted at high quality of service levels.

13. The method according to claim 8, wherein if available transmission resources can not satisfy a resource demand for at least two D2D services to be transmitted, then transmission resources are selected for the D2D services to be transmitted, by selecting a transmission resource preferentially for a service to be transmitted at a high quality of service level.

14. The method according to claim 8, wherein selecting the transmission resources for the D2D services to be transmitted, according to the received information about the D2D resource configurations corresponding to the quality of service levels of the D2D services comprises:
    if the transmission resources selected for the D2D services to be transmitted, according to the received information about the D2D resource configurations corresponding to the quality of service levels of the D2D services to be transmitted can not satisfy transmission requirements of the D2D services to be transmitted, then selecting the transmission resources for the D2D services to be transmitted, according to information about D2D resource configurations of low quality of service levels which are lower than the quality of service levels of the D2D services to be transmitted.

15. An apparatus for allocating a D2D resource, the apparatus comprising:
    a D2D resource configuring module configured to determine D2D resource configurations corresponding to quality of service levels of D2D services; and
    a D2D resource configuration information transmitting module configured to transmit information about the D2D resource configurations corresponding to the quality of service levels of the D2D services to a user equipment;
    wherein the D2D resource configuring module is configured:
        to determine D2D resource pool configurations corresponding to the respective quality of service levels of the D2D services; and
    the D2D resource configuration information transmitting module is configured:
        to transmit information about the D2D resource pool configurations corresponding to the respective quality of service levels of the D2D services to the user equipment.

16. An apparatus for transmitting D2D data, the apparatus comprising:
    a D2D transmission resource selecting module configured to select transmission resources for D2D services to be transmitted, according to received information about D2D resource configurations corresponding to quality of service levels of the D2D services; and
    a D2D data transmitting module configured to transmit data of the D2D services over the selected transmission resources;
    wherein the D2D transmission resource selecting module is configured:
        to determine D2D resource pools corresponding to the quality of service levels of the D2D services to be transmitted; and to select the transmission resources in the determined D2D resource pools, for the D2D services to be transmitted, according to received information about D2D resource pool configurations corresponding to the respective quality of service levels of the D2D services.

* * * * *